United States Patent
Butler et al.

(10) Patent No.: US 8,996,662 B2
(45) Date of Patent: Mar. 31, 2015

(54) METHODS AND SYSTEM FOR PROVIDING CONTENT TO A MOBILE COMMUNICATION DEVICE

(75) Inventors: Brian Steven Butler, London (GB); Shiladitya Sircar, Kanata (CA); Arun Kumar, Kanata (CA); Patrick Mollins, Kanata (CA); Vikram Kewalramani, Mississauga (CA)

(73) Assignee: BlackBerry Limited, Waterloo, Ontario ( * ) Notice: Subject to any disclaimer, the term of this patent is extended or adjusted under 35 U.S.C. 154(b) by 337 days.

(21) Appl. No.: 13/635,266

(22) PCT Filed: Jan. 12, 2011

(86) PCT No.: PCT/CA2011/050009
§ 371 (c)(1), (2), (4) Date: Sep. 14, 2012

(87) PCT Pub. No.: WO2012/094721
PCT Pub. Date: Jul. 19, 2012

(65) Prior Publication Data
US 2013/0013750 A1  Jan. 10, 2013

(51) Int. Cl.
G06F 15/167 (2006.01)
H04W 4/04 (2009.01)
H04L 29/08 (2006.01)
H04L 12/28 (2006.01)

(52) U.S. Cl.
CPC ............... *H04W 4/04* (2013.01); *H04L 67/16* (2013.01); *H04L 12/2812* (2013.01); *H04L 67/28* (2013.01)
USPC ........................................................ 709/219

(58) Field of Classification Search
CPC . H04L 12/2812; H04L 67/16; H04L 65/4084; H04L 65/605
USPC .......................................................... 709/219
See application file for complete search history.

(56) References Cited

U.S. PATENT DOCUMENTS

2005/0216519 A1   9/2005   Mayo et al.
2006/0168351 A1*  7/2006   Ng et al. ................... 709/248
(Continued)

FOREIGN PATENT DOCUMENTS

EP   2088748   8/2009
EP   2164231   3/2010
(Continued)

OTHER PUBLICATIONS

International Searching Authority, International Search Report and Written Opinion issued in International application No. PCT/CA2011/050009, dated Sep. 20, 2011, 10 pages.
(Continued)

*Primary Examiner* — Larry Donaghue
(74) *Attorney, Agent, or Firm* — Hanley, Flight & Zimmerman, LLC

(57) ABSTRACT

A method and server for facilitating the transmission of content to a mobile communication device connected to a host computer are provided. The method comprises: sending a content queue request to the mobile communication device from a web application running within a web browser; in response to sending the content queue request, receiving at the host computer a content queue from the mobile communication device, the content queue identifying one or more locations of remote servers associated with content; retrieving content, by the web application, in accordance with the one or more locations identified in the content queue; and sending the content from the host computer to the mobile communication device.

20 Claims, 10 Drawing Sheets

(56) References Cited

U.S. PATENT DOCUMENTS

| | | | |
|---|---|---|---|
| 2006/0265637 A1* | 11/2006 | Marriott et al. | 715/500.1 |
| 2006/0268667 A1* | 11/2006 | Jellison et al. | 369/30.08 |
| 2007/0043766 A1* | 2/2007 | Nicholas et al. | 707/104.1 |
| 2007/0299873 A1* | 12/2007 | Jones et al. | 707/104.1 |
| 2007/0299874 A1* | 12/2007 | Neumann et al. | 707/104.1 |
| 2008/0046948 A1* | 2/2008 | Verosub | 725/117 |
| 2008/0187112 A1* | 8/2008 | Koberstein et al. | 379/88.17 |
| 2010/0049608 A1 | 2/2010 | Grossman | |

FOREIGN PATENT DOCUMENTS

| | | |
|---|---|---|
| WO | 03019796 | 3/2003 |
| WO | 2009015257 | 1/2009 |

OTHER PUBLICATIONS

Nokia Ovi, Welcome to Ovi, Stay up-to-date and connected, http://web.archive.org/web/20090409074320/http://www.ovi.mobi/?, Apr. 9, 2009, 1 page.

Android, Android Market, http://web.archive.org/web/20100627054757/http://www.android.com/m . . . , Jun. 27, 2010, 1 page.

Apple, Download Music and More with iTunes. Play it all on iPod., http://web.archive.org/web/20100218093428/http://www.apple.com/itunes/, Feb. 18, 2010, 2 pages.

Apple, iPhone—Download games and applications for iPhone, http://web.archive.org/web/20090629061248/http://www.apple.com/ipho . . . , Jun. 29, 2009, 2 pages.

Ovi, Introducing Nokia Ovi Suite, bring your Nokia mobile and PC together as one, http://web.archive.org/web/20100415082408/http://www.comms.ovi.co . . . , Apr. 15, 2010, 1 page.

Research in Motion Limited, KB16248—Vulnerability exists in BlackBerry Application Web Loader ActiveX control, http://btsc.webapps.blackberry.com/btsc/viewdocument.do;jsessionid=0 . . . , published Feb. 10, 2009, 3 pages.

Ovi Store: IQ Lite, http://web.archive.org/web/20100715155933/http://store.ovi.com/conten . . . , Jul. 15, 2010, 1 page.

European Patent Office, "Extended European Search Report", issued in connection with European Patent Application No. 11855820.4, mailed on Dec. 4, 2014, 6 pages.

* cited by examiner

METHODS AND SYSTEM FOR PROVIDING CONTENT TO A MOBILE COMMUNICATION DEVICE

TECHNICAL FIELD

The present disclosure relates to content delivery systems, and more particularly to a method and system for providing content from a content server to a mobile communication device.

BACKGROUND

Mobile devices may include applications for interacting with digital content. The digital content may include any information which is published or distributed in a digital form. The digital content may, in various embodiments, include video files, audio files, e-books, web-pages, images, icons, themes, applications, and/or games. Other types of digital content are also possible.

Mobile devices, such as mobile communication devices, often permit digital content to be downloaded via wireless communication with one or more servers. For example, Internet connected mobile communication devices may download digital content from one or more remote servers accessible through the Internet.

Obtaining content in this manner may, in various systems, be quite slow. Also, in some situations, the download of content in this manner may be costly since it results in the consumption of wireless bandwidth.

Thus, there exists a need to provide improved methods and systems for providing content to devices.

BRIEF DESCRIPTION OF THE DRAWINGS

It will be noted that throughout the drawings and description similar features are identified by the same reference numerals.

DETAILED DESCRIPTION OF EXAMPLE EMBODIMENTS

The present disclosure describes a method for transmitting content to a device connected to a host computer. The method includes: sending a content queue request to the device from a web application running within a web browser; in response to sending the content queue request, receiving at the host computer a content queue from the device, the content queue identifying one or more locations of remote servers associated with content; retrieving content, by the web application, in accordance with the one or more locations identified in the content queue; and sending the content from the host computer to the device.

In another aspect, the present disclosure describes a server. The server includes a memory storing a web application. The web application is configured to: send a content queue request from the web application running within a web browser on a host computer to a device connected to the host computer; in response to sending the content queue request, receive at the host computer a content queue from the device, the content queue identifying one or more locations of remote servers associated with content; retrieve content in accordance with the one or more locations identified in the content queue; and send the content from the host computer to the device.

In yet a further aspect, the present disclosure describes a method for transmitting content to a device connected to a host computer. The method includes: i) receiving instructions through a web browser to download queued content; and ii) in response to receiving instructions to download queued content: sending a request to the device, from the web browser, to obtain a content queue from the device, the content queue identifying content which is stored on one or more remote servers; receiving the content queue at the host computer; retrieving, by the host computer, the content listed in the content queue from the one or more remote servers; and transmitting the content from the host computer to the device.

Other example embodiments of the present application will be apparent to those of ordinary skill in the art from a review of the following detailed description in conjunction with the drawings.

Example embodiments of the present application are not limited to any particular operating system, mobile device architecture, server architecture, or computer programming language.

System Overview

Figure 1:
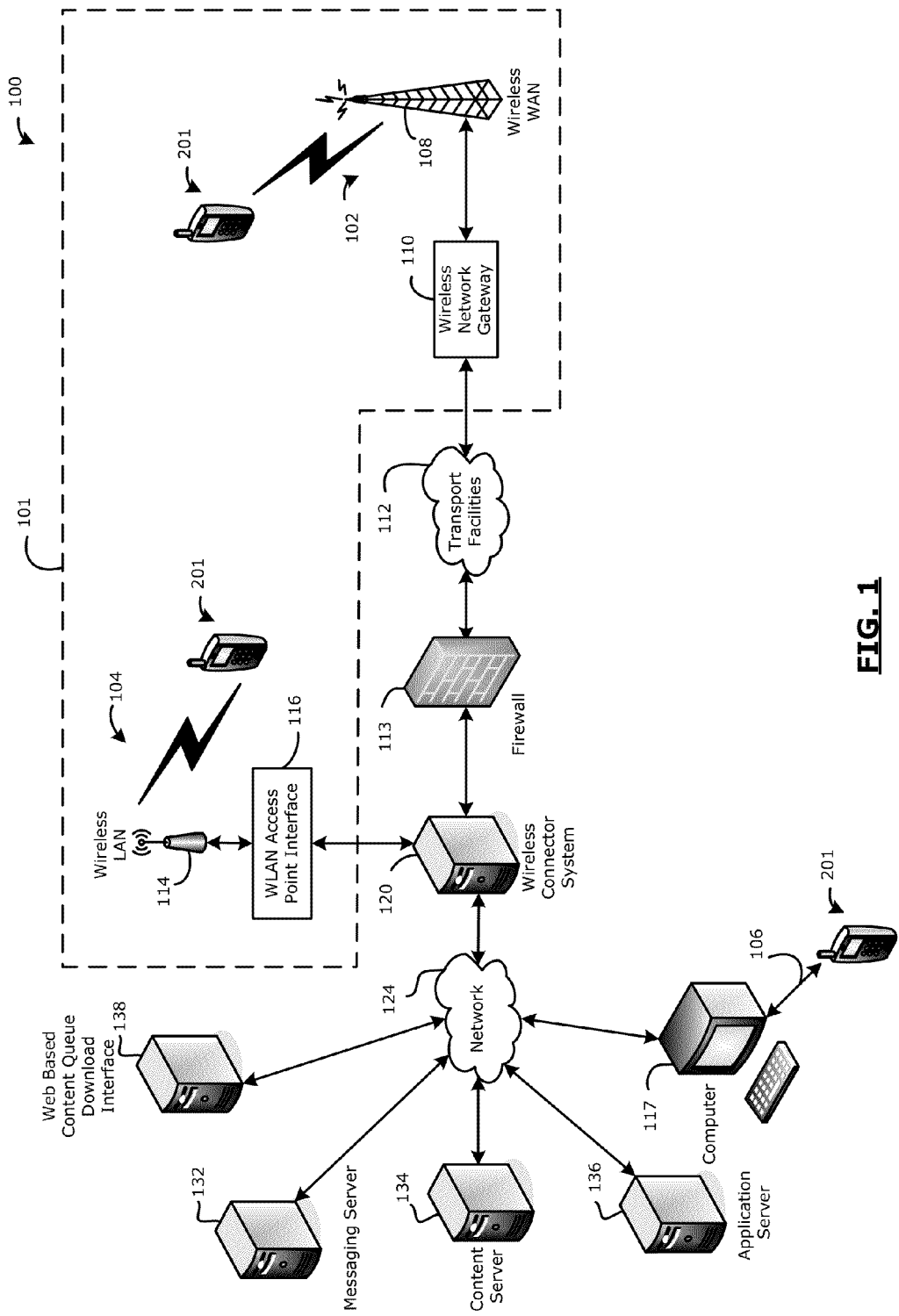
FIG. 1 is a block diagram illustrating a communication system in which example embodiments of the present disclosure can be applied.

In order to facilitate an understanding of one possible environment in which example embodiments described herein can operate, reference is first made to FIG. 1 which shows, in block diagram form, a communication system 100 in which example embodiments of the present disclosure can be applied. The communication system 100 includes a number of mobile communication devices 201 which may be connected to the remainder of the system 100 in any of several different ways. Accordingly, several instances of mobile communication devices 201 are depicted in FIG. 1 employing different example ways of connecting to system 100. Mobile communication devices 201 are connected to a wireless network 101 which may include one or more of a Wireless Wide Area Network (WWAN) 102 and a Wireless Local Area Network (WLAN) 104 or other suitable network arrangements.

In some example embodiments, the mobile communication devices 201 are configured to communicate over both the WWAN 102 and WLAN 104, and to roam between these networks. In some example embodiments, the wireless network 101 may include multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1) where each of the base stations 108 provides wireless Radio Frequency (RF) coverage to a corresponding area or cell. The WWAN 102 is typically operated by a mobile network service provider that provides subscription packages to users of the mobile communication devices 201. In some example embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX"), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further include a wireless network gateway 110 which connects the mobile communication devices 201 to transport facilities 112, and through the transport facilities 112 to a wireless connector system 120. Transport facilities may include one or more private networks or lines, the public Internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120 may be operated by a mobile network provider. In some example embodiments, the network 124 may be realized using the Internet rather than an internal or enterprise network.

The wireless network gateway 110 provides an interface between the wireless connector system 120 and the WWAN 102, which facilitates communication between the mobile communication devices 201 and other devices (not shown) connected, directly or indirectly, to the WWAN 102. Accordingly, communications sent via the mobile communication devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 201.

The WLAN 104 includes a wireless network which, in some example embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other example embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an Internet service provider (ISP), a mobile network provider, or a property owner in a public or semi-public area, for example. The access points 114 are connected to an access point (AP) interface 116 which may connect to the wireless connector system 120 directly (for example, if the access point 114 is part of an enterprise WLAN 104 in which the wireless connector system 120 resides), or indirectly via the transport facilities 112 if the access point 114 is a personal Wi-Fi network or Wi-Fi hotspot (in which case a mechanism for securely connecting to the wireless connector system 120, such as a virtual private network (VPN), may be used). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email communications, to and from a set of managed mobile communication devices 201. The wireless connector system 120 also provides administrative control and management capabilities over users and mobile communication devices 201 which may connect to the wireless connector system 120.

The wireless connector system 120 allows the mobile communication devices 201 to access the network 124 and connected resources and services such as a messaging server 132 (for example, a Microsoft Exchange™, IBM Lotus Domino™, or Novell GroupWise™ email server), and a content server 134 for providing content such as Internet content or content from an organization's internal servers, and application servers 136 for implementing server-based applications such as instant messaging (IM) applications to mobile communication devices 201.

The wireless connector system 120 provides a secure exchange of data (e.g., email messages, personal information manager (PIM) data, and IM data) with the mobile communication devices 201. In some example embodiments, communications between the wireless connector system 120 and the mobile communication devices 201 are encrypted. In some example embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data. In some example embodiments, the private encryption key is stored only in the user's mailbox on the messaging server 132 and on the mobile communication device 201, and can be regenerated by the user on mobile communication devices 201. Data sent to the mobile communication devices 201 is encrypted by the wireless connector system 120 using the private encryption key retrieved from the user's mailbox. The encrypted data, when received on the mobile communication devices 201, is decrypted using the private encryption key stored in memory. Similarly, data sent to the wireless connector system 120 from the mobile communication devices 201 is encrypted using the private encryption key stored in the memory of the mobile communication device 201. The encrypted data, when received on the wireless connector system 120, is decrypted using the private encryption key retrieved from the user's mailbox.

The wireless network gateway 110 is adapted to send data packets received from the mobile communication device 201 over the WWAN 102 to the wireless connector system 120. The wireless connector system 120 then sends the data packets to the appropriate connection point such as the messaging server 132, content server 134, web based content queue download interface 138 or application servers 136. Conversely, the wireless connector system 120 sends data packets received, for example, from the messaging server 132, content server 134, or application servers 136 to the wireless network gateway 110 which then transmit the data packets to the destination mobile communication device 201. The AP interfaces 116 of the WLAN 104 provide similar sending functions between the mobile communication device 201, the wireless connector system 120 and network connection point such as the messaging server 132, content server 134, and application server 136.

The network 124 may include a private local area network, metropolitan area network, wide area network, the public Internet or combinations thereof and may include virtual networks constructed using any of these, alone, or in combination.

A link 106 may be provided for exchanging information between the mobile communication device 201 and a host computer 117 connected to a network 124, such as the Internet. The link 106 may include one or both of a physical interface and short-range wireless communication interface. The physical interface may include one or combinations of an Ethernet connection, Universal Serial Bus (USB) connection, Firewire™ (also known as an IEEE 1394 interface) connection, or other serial data connection, via respective ports or interfaces of the mobile communication device 201 and host computer 117. In one example embodiment, the link 106 is a USB connection to the mobile communication device 201. In at least some example embodiments, the link 106 is a Bluetooth™ connection.

The host computer 117 has access to a web-based content queue download interface 138 through an Internet browser on the host computer 117. The Internet browser (also known as a web browser) on the host computer 117 may access the web based content queue download interface 138 by establishing a hypertext transfer protocol (HTTP) connection or hypertext transfer protocol secure (HTTPS) connection to the web-based content queue download interface 138 which is includes a web server, accessible through the Internet. The web server includes memory which has stored thereon a web application 602 (FIG. 6) for facilitating the download of content which has been queued for download on the device.

The web-based content queue download interface 138 may provide the web application 602 (FIG. 6) to the Internet browser on the host computer 117. The web application 602 (FIG. 6) facilitates the download of digital content to the device 201. More particularly, content may be queued for download to the device by a user of the device 201. The web application uses the host computer's 117 connection to the network 124 to download content which has been queued for download to the device 201 from one or more content servers 134.

The host computer 117 typically connects to the network 124 via a connection protocol which is typically cheaper than the connection protocol used to connect the device 201 to the network. Accordingly, by downloading content to the device 201 using the host computer's 117 connection rather than the wireless device's 201 connection, the cost of delivering the content to the device 201 may be reduced.

Furthermore, as will be explained in greater detail below, by using a web application 602 in order to facilitate the download of content to the device 201, content may be downloaded to the device 201 using most (if not all) host computers 117. By using a web application 602 which operates in an Internet browser, content may be downloaded to the device without having to install large software on the host computer 117.

Accordingly, the web application 602 permits content to be downloaded from a content server 134 to a device 201 connected to the host computer 117 via the link 106. The web application 602 is a web-based client for end users which is described in greater detail below. In some example embodiments, the web application 602 may provide functions or features in addition to or instead of the ability to download queued to the device 201. In some example embodiments, the web application may provide other device management functions. In such example embodiments, the web application 602 (FIG. 6) may also be referred to as a web-based application management application.

The web application 602 (FIG. 6) may be received, for example, by the host computer 117 when the Internet browser on the host computer 117 navigates to a location associated with the web-based content queue download interface. For example, the Internet browser may navigate to the web-based content queue download interface 138 using a uniform resource locator (URL) associated with the web-based content queue download interface 138.

The content server 134 is configured to deliver digital content to the host computer 117 upon request by the host computer 117. The content server 134 may, in at least some example embodiments, be a publicly accessible server which hosts digital content. The content server 134 is, in at least some example embodiments, a web server which delivers content using the Hypertext Transfer Protocol (HTTP) or another suitable protocol over the World Wide Web. The content server 134 may host one or more web pages or other digital content. The web pages may, in at least some example embodiments, provide an interface for accessing other digital content. For example, the web pages may include one or more links to other content, such as, for example, audio files, images, video files, etc.

Accordingly, the content server 134 is configured to serve digital content. The digital content may, in various example embodiments, include video files, audio files, documents, podcasts, e-books, web-pages, images such as photographs, icons, themes, applications, and/or games. Other types of digital content are also possible. The digital content may include any information which is published or distributed in a digital form.

The host computer 117 typically includes a controller having at least one processor (i.e., microprocessor) for controlling its operation, a communications subsystem connected to the processor for communicating with the communication system 100, a display screen or monitor connected to the processor, one or more user input devices such as a keyboard and mouse connected to the processor for sending user input signals to the processor in response to user inputs, a memory or storage element connected to the processor such as a hard disk drive (HDD), RAM, ROM and/or other suitable memory connected to the processor, and other suitable input and output devices as desired or required. The memory has data and instructions stored thereon for configuring the processor and host computer 117. Operating system software, software applications, and data used by the processor are stored in the memory. The software and data configure the operation of the host computer 117. Other features of the host computer 117 for implementing the processes and functions described herein will be appreciated by persons ordinarily skilled in the art.

It will be appreciated that the above-described communication system is provided for the purpose of illustration only, and that the above-described communication system includes one possible communication network configuration of a multitude of possible configurations for use with the mobile communication devices 201. The teachings of the present disclosure may be employed in connection with other types of networks and associated devices that are effective in implementing or facilitating wireless communication. Suitable variations of the communication system will be understood to a person of skill in the art and are intended to fall within the scope of the present disclosure.

Example Mobile Communication Device

Figure 2:
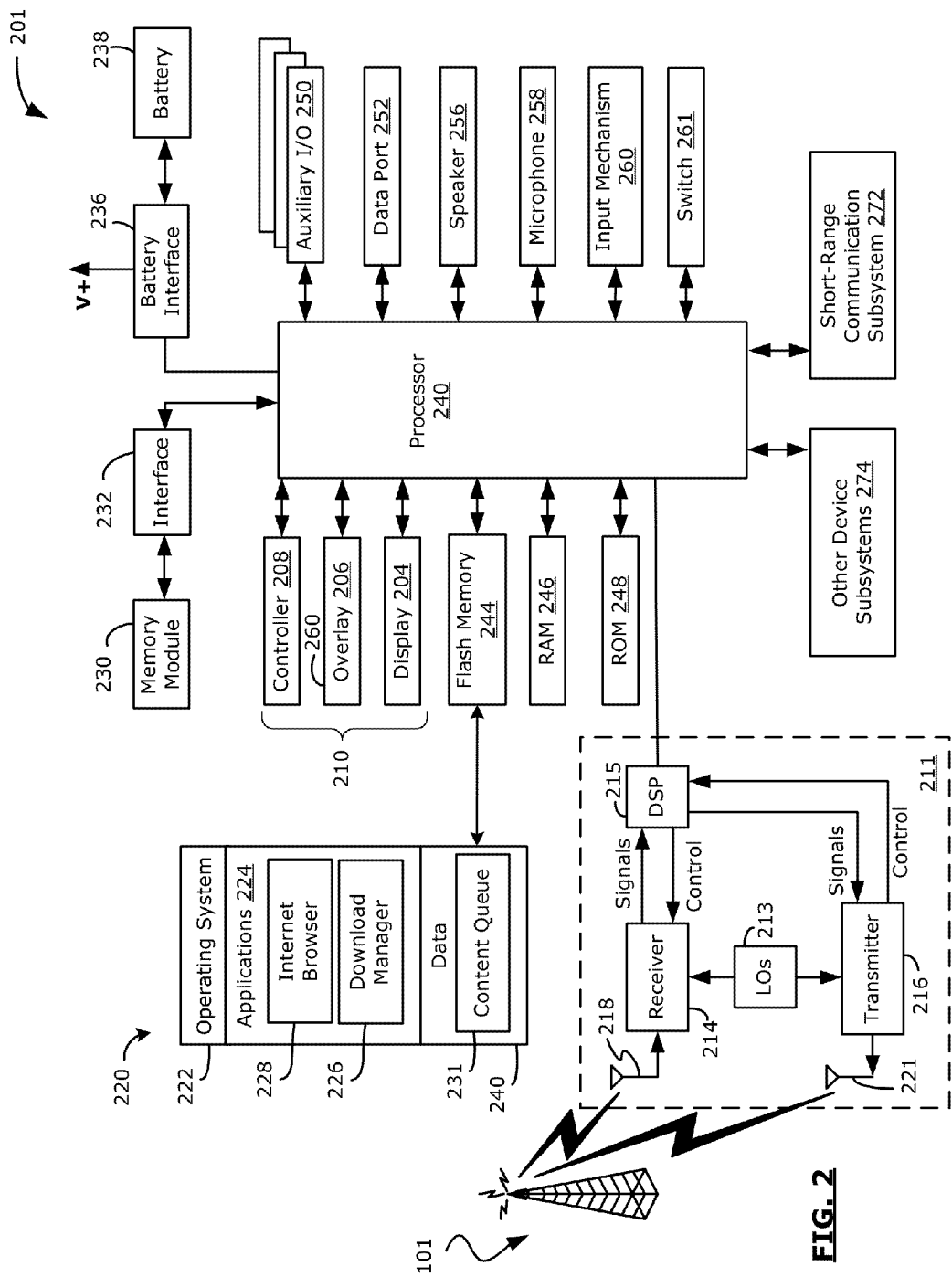
FIG. 2 is a block diagram illustrating a mobile communication device in which example embodiments of the present disclosure can be applied.

Reference is now made to FIG. 2 which illustrates a mobile communication device 201 in which example embodiments described in the present disclosure can be applied. The mobile communication device 201 is a two-way communication device having at least data and possibly also voice communication capabilities, and the capability to communicate with other computer systems, for example, via the Internet. Depending on the functionality provided by the mobile communication device 201, in various example embodiments the mobile communications device 201 may be a data communication device, a multiple-mode communication device configured for both data and voice communication, a smartphone, a mobile telephone or a PDA (personal digital assistant) enabled for wireless communication, or a computer system with a wireless modem. The mobile communications device 201 may also be referred to as a mobile device 201 and, in some cases, as a device 201.

The mobile communication device 201 includes a controller including at least one processor 240 such as a microprocessor which controls the overall operation of the mobile communication device 201, and a wireless communication subsystem 211 for exchanging radio frequency signals with the wireless network 101. The processor 240 interacts with the communication subsystem 211 which performs communication functions. The processor 240 interacts with additional device subsystems. In some example embodiments, the mobile device 201 may include a touchscreen display 210 which includes a display (screen) 204, such as a liquid crystal display (LCD) screen, with a touch-sensitive input surface or overlay 206 connected to an electronic controller 208. The touch-sensitive overlay 206 and the electronic controller 208 act as an input mechanism 260 to provide a touch-sensitive input device. The processor 240 also interacts with the touch-sensitive overlay 206 via the electronic controller 208. In other example embodiments, the display 204 may not be a touchscreen display. Instead, the mobile device 201 may simply include a non-touch display and one or more input mechanisms 260, such as, for example, a depressible scroll wheel or other control keys.

The processor 240 interacts with additional device subsystems including flash memory 244, random access memory (RAM) 246, read only memory (ROM) 248, auxiliary input/output (I/O) subsystems 250, data port 252 such as serial data port, such as a Universal Serial Bus (USB) data port, speaker 256, microphone 258, control keys 260, switch 261, short-range communication subsystem 272, and other device subsystems generally designated as 274. Some of the subsystems shown in FIG. 2 perform communication-related functions, whereas other subsystems may provide "resident" or on-device functions.

The communication subsystem 211 includes a receiver 214, a transmitter 216, and associated components, such as one or more antenna elements 218 and 221, local oscillators (LOs) 213, and a processing module such as a digital signal processor (DSP) 215. The antenna elements 218 and 221 may be embedded or internal to the mobile communication device 201 and a single antenna may be shared by both receiver and transmitter, as is known in the art. As will be apparent to those skilled in the field of communication, the particular design of the communication subsystem 211 depends on the wireless network 101 in which the mobile communication device 201 is intended to operate.

The mobile communication device 201 may communicate with any one of a plurality of fixed transceiver base stations 108 (FIG. 1) of the wireless network 101 within its geographic coverage area. The mobile communication device 201 may send and receive communication signals over the wireless network 101 after a network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 215. In a similar manner, signals to be transmitted are processed, including modulation and encoding, for example, by the DSP 215. These DSP-processed signals are input to the transmitter 216 for digital-to-analog (D/A) conversion, frequency up conversion, filtering, amplification, and transmission to the wireless network 101 via the antenna 221. The DSP 215 not only processes communication signals, but may also provide for receiver and transmitter control. For example, the gains applied to communication signals in the receiver 214 and the transmitter 216 may be adaptively controlled through automatic gain control algorithms implemented in the DSP 215.

The processor 240 operates under stored program control and executes software modules 220 stored in memory such as persistent memory, for example, in the flash memory 244. As illustrated in FIG. 2, the software modules 220 include operating system software 222, software applications 224 which include a download manager 226, and in some example embodiments, an Internet browser 228.

As will be explained in greater detail below, the download manager 228 maintains and accesses a content queue 231.

The content queue 231 identifies one or more locations which are associated with content which is to be downloaded to the device. Accordingly, the content queue 231 tracks content which is to be downloaded to the device 201 from a remote server, such as the content server 134 of FIG. 1.

The content is digital content, such as, for example, video files, audio files, documents, podcasts, e-books, web-pages, images such as photographs, icons, themes, applications, and/or games. Other types of digital content are also possible.

The location of the content in the content queue may, for example, a uniform resource locator (URL), which specifies a specific location at which the content is available. For example, the content queue may list a location of a remote server, such as a content server 134 (FIG. 1), where the content is stored. The content queue may, in at least some example embodiments, specify a location of the content server 134 and, in some example embodiments, a path and/or filename of the content. The location of the content server 134 may be specified in terms of a domain name or an IP address.

In some example embodiments, the content may be part of a web feed. In such example embodiments, the content queue may identify a location of the web-feed. A web feed is a data format which is used for providing frequently updated content. The web feed is, in at least some example embodiments, syndicated through web syndication. Web syndication is a form of syndication in which website material is made available to other sites. In at least some example embodiments, the content queue may identify a location of a Really Simply Syndication (RSS) web feed. The RSS feed format is specified through the use of Extensible Markup Language (XML). Accordingly, in at least some example embodiments, the content queue may specify the location of an XML feed.

In at least some example embodiments, the web feed may be a podcast. A podcast is a series of digital media files, such as audio or video files, which are released episodically. Accordingly, in at least some example embodiments, content queue identifies the location of a podcast.

In at least some embodiments, the web feed contains a location of digital content which is included in the web feed. For example, where the web feed is a podcast, the web feed may identify locations at which the audio or video files in the podcast are stored.

In at least some example embodiments, the content queue may also include information about previously downloaded content. For example, where the content queue includes a location of a web feed, the content queue may also include information regarding the last download of content from that web feed. By way of example, the content queue may specify any one or more of: a list of all content downloaded from the web feed; an identification of the last content downloaded from the web feed; or a date and/or time when a download from the web feed was last attempted. In at least some example embodiments, the information regarding the last download of content may be specified in terms of a publication date and time of the last content downloaded from the web feed. For example, where the web feed is a podcast, the information may specify the publication date and time of the last audio file downloaded from that podcast to the device 201.

As will be explained in greater detail below, the information regarding the last download of content may be used by a web application 602 (FIG. 6) to reduce the likelihood that the same content is not repeatedly downloaded to the device 201.

In at least some example embodiments, the download manager may include an API (application programming interface) (not shown), which permits other applications on the device to access the content queue. The API may allow other applications to manage the content queue. For example, the API may allow other applications to add content to the content queue. In at least some example embodiments, content may be added to the content queue by adding the location of the content to the content queue. In at least some example embodiments, when content is added to the queue, the content is added at the end of the queue. That is, when the API receives a command to add content located at a specified location to the content queue, the API may add the specified location to the end of the queue. When the location of content is added to the content queue, further information about the content may also be added to the content queue. For example, an identifier, such as a name of the content may be downloaded. Similarly, a file size of the content may be added to the content queue. In some example embodiments, the location of the content may be added to the content queue together with a timestamp. The timestamp may indicate the date and time when the location of the content was added to the content queue.

In some example embodiments, the API may allow other applications to remove content from the content queue. For example, content may be removed from the content queue by removing the location of that content from the content queue and, in at least some example embodiments, by removing any further information about the content from the content queue.

In some example embodiments, the API may allow other applications to alter the order of the content queue. That is, the API may allow other applications to increase or decrease the position of content in the queue relative to the position of other content in the queue. In at least some example embodiments, the order of the content queue may determine the order in which content in the content queue will be downloaded.

The download manager 226, in at least some example embodiments, includes a graphical user interface for managing the content queue. The graphical user interface may display interface elements, such buttons, text boxes, hyperlinks, drop-down lists, list boxes, combo boxes, check boxes, radio buttons and/or datagrids, which allow a user to input commands to the download manager. For example, the graphical user interface may include one or more interface elements for adding content to the content queue. That is, a user may interact with an input mechanism 260 associated with the device to activate an interface element and input an instruction to add content to the content queue.

When the download manager receives a command to add content to the content queue through the graphical user interface, the download manager may add content in a manner similar to the manner in which content is added to the content queue if the command is received through the API. That is, if the download manager receives a command to add content located at a specified location to the content queue, the download manager may add the specified location to the end of the queue. As discussed previously, when the location of content is added to the content queue, further information about the content may also be added to the content queue. For example, an identifier, such as a name of the content may be added. Similarly, a file size of the content may be added to the content queue. In some example embodiments, the location of the content may be added to the content queue together with a timestamp. The timestamp may indicate the date and time when the location of the content was added to the content queue.

The graphical user interface of the download manager may also include one or more interface elements for removing content from the content queue. For example, in at least some example embodiments, the graphical user interface may be configured to display a list of content in the content queue. The list may, in some example embodiments, include all content in the content queue. In some example embodiments, the content queue may be too large to permit displaying the complete contents of the content queue on a single page. In such example embodiments, the contents of the content queue may be split so that only a portion of the content queue is displayed at any given time. The list may also display an interface element which permits a user to select any of the content to be removed from the content queue. For example, a user may interact with an input mechanism associated with the device to input an instruction to remove content from the content queue.

The graphical user interface of the download manager may also include one or more interface elements for altering the order of content in the content queue. For example, in at least some example embodiments, the graphical user interface may display the list of content in the content queue together with user interface elements which permit a user to increase or decrease the position of content in the content queue relative to the position of other content in the content queue. A user of the device 201 may interact with an input mechanism associated with the device to input an instruction to alter the order of content in the content queue.

In at least some example embodiments, the software modules 220 of the device 201 include an Internet browser 228. The Internet browser 228 may also be referred to as a web browser. The Internet browser is configured for retrieving and presenting content on the World Wide Web. The content which may be retrieved by the Internet browser 228 may be a web page, image, video, or other type of content.

In at least some example embodiments, the Internet browser 228 is configured to accept instructions, via an input mechanism of the device, to add content to the content queue. For example, in some example embodiments, the Internet browser 228 may display an interface element on the display of the device 201 which permits a user to input instructions to add content to the content queue. In response to receiving instructions to add content to the content queue, the Internet browser may add content to the content queue. In at least some example embodiments, the Internet browser may interact with the download manager to add content to the content queue. For example, the Internet browser may access the API of the download manager to input instructions to the download manager to add content to the content queue.

In some example embodiments, the download manager 226 may be a standalone software application. In other example embodiments, the download manager may be a software module including in another program or application. For example, in at least some example embodiments, the download manager may be included in the Internet browser 228. In some example embodiments, the functions performed by the above identified applications 224 may be realized as a plurality of independent elements, rather than a single integrated element, and any one or more of these elements may be implemented as parts of other software applications.

In other example embodiments, the functions described with reference to the download manager may be split into multiple applications or modules, each performing a subset of the functions of the download manager.

The software modules 220 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

The software applications 224 may include a range of other applications, including, for example, an address book application, a messaging application, a calendar application, and/or a notepad application. In some example embodiments, the software applications 224 include an email message application, a push content viewing application, a voice communication (i.e. telephony) application, a map application, and a media player application. Each of the software applications 224 may include layout information defining the placement of particular fields and graphic elements (e.g. text fields, input fields, icons, etc.) in the user interface (i.e. the display device 204) according to the application.

In some example embodiments, the auxiliary input/output (I/O) subsystems 250 may include an external communication link or interface, for example, an Ethernet connection. The mobile communication device 201 may include other wireless communication interfaces for communicating with other types of wireless networks, for example, a wireless network such as an orthogonal frequency division multiplexed (OFDM) network or a GPS transceiver for communicating with a GPS satellite network (not shown). The auxiliary I/O subsystems 250 may include a vibrator for providing vibratory notifications in response to various events on the mobile communication device 201 such as receipt of an electronic communication or incoming phone call, or for other purposes such as haptic feedback (touch feedback).

In some example embodiments, the mobile communication device 201 also includes a removable memory module 230 (typically including flash memory, such as a removable memory card) and a memory interface 232. Network access may be associated with a subscriber or user of the mobile communication device 201 via the memory module 230, which may be a Subscriber Identity Module (SIM) card for use in a GSM network or other type of memory card for use in the relevant wireless network type. The memory module 230 is inserted in or connected to the memory card interface 232 of the mobile communication device 201 in order to operate in conjunction with the wireless network 101.

The mobile communication device 201 stores data 240 in an erasable persistent memory, which in one example embodiment is the flash memory 244. In various example embodiments, the data 240 includes service data including information required by the mobile communication device 201 to establish and maintain communication with the wireless network 101. The data 240 may also include user application data such as email messages, address book and contact information, calendar and schedule information, notepad documents, image files, and other commonly stored user information stored on the mobile communication device 201 by its user, and other data. The data 240 stored in the persistent memory (e.g. flash memory 244) of the mobile communication device 201 may be organized, at least partially, into a number of databases each containing data items of the same data type or associated with the same application. For example, email messages, contact records, and task items may be stored in individual databases within the mobile device memory.

In some example embodiments, the data 240 includes the content queue 231. As noted previously, the content queue 231 identifies content which has been queued for download to the mobile device 201. As discussed above, the content queued for download may be identified by a location associated with the content.

The serial data port 252 may be used for synchronization with a user's host computer 117 and for interacting with a web-based application store application on the host computer 117.

In some example embodiments, the mobile communication device 201 is provided with a service routing API which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their mobile communication device 201 to the host computer system via a USB cable or Bluetooth® connection, traffic that was destined for the wireless network 101 is automatically routed to the mobile communication device 201 using the USB cable or Bluetooth® connection. Similarly, any traffic destined for the wireless network 101 is automatically sent over the USB cable or Bluetooth® connection to the host computer system for processing.

The mobile communication device 201 also includes a battery 238 as a power source, which is typically one or more rechargeable batteries that may be charged, for example, through charging circuitry coupled to a battery interface 236 such as the serial data port 252. The battery 238 provides electrical power to at least some of the electrical circuitry in the mobile communication device 201, and the battery interface 236 provides a mechanical and electrical connection for the battery 238. The battery interface 236 is coupled to a regulator (not shown) which provides power V+ to the circuitry of the mobile communication device 201.

The short-range communication subsystem 272 is an additional optional component which provides for communication between the mobile communication device 201 and different systems or devices, which need not necessarily be similar devices. For example, the subsystem 272 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and possibly voice communication applications will normally be installed on the mobile communication device 201 during or after manufacture. Additional applications and/or upgrades to the operating system 222 or software applications 224 may also be loaded onto the mobile communication device 201 through the wireless network 101, the auxiliary I/O subsystem 250, the data port 252, the short-range communication subsystem 272, or other suitable subsystem 274 other wireless communication interfaces. The downloaded applications or code modules may be permanently installed, for example, written into the program memory (i.e. the flash memory 244), or written into and executed from the RAM 246 for execution by the processor 240 at runtime. Such flexibility in application installation increases the functionality of the mobile communication device 201 and may provide enhanced on-device functions, communication-related functions, or both. For example, secure communication applications may enable electronic commerce functions and other such financial transactions to be performed using the mobile communication device 201.

The mobile communication device 201 may provide two principal modes of communication: a data communication mode and an optional voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email message application and output to the display 242. A user of the mobile communication device 201 may also compose data items, such as email messages, for example, using the touch-sensitive overlay 206 in conjunction with the display device 204 and possibly the control buttons 260 and/or the auxiliary I/O subsystems 250. These composed items may be transmitted through the communication subsystem 211 over the wireless network 101.

In the voice communication mode, the mobile communication device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., the voice communication module) and hardware (i.e., the microphone 258, the speaker 256 and input devices). Alternative voice or audio I/O subsystems, such as a voice message recording subsystem, may also be implemented on the mobile communication device 201. Although voice or audio signal output is typically accomplished primarily through the speaker 256, the display device 204 may also be used to provide an indication of the identity of a calling party, duration of a voice call, or other voice call related information.

Adding Content to the Content Queue

Figure 3:
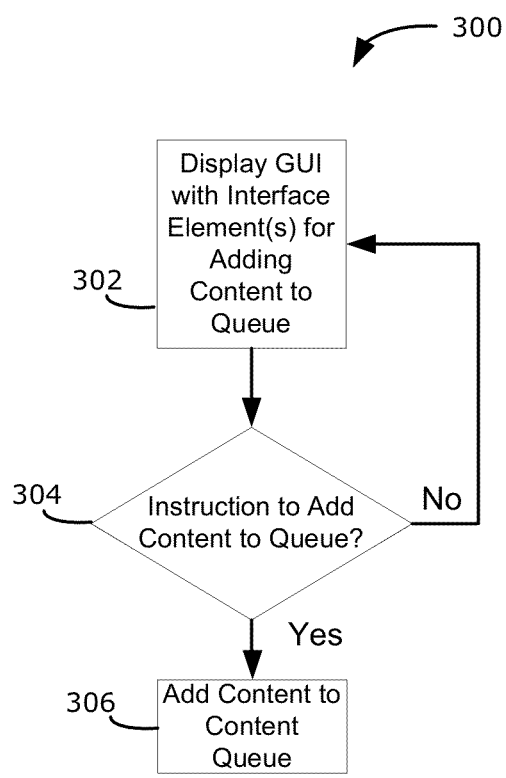
FIG. 3 is a flowchart illustrating a method of adding content to a content queue in accordance with example embodiments of the present disclosure.

Referring now to FIG. 3, a flowchart of a method 300 for adding content to a content queue is illustrated. One or more application or module stored in memory of the device 201 may be configured to perform the method 300 of FIG. 3. More particularly, one or more application or module may contain computer readable instructions which cause the processor 240 (FIG. 2) of the device 201 to perform the method 300. In at least some example embodiments, a download manager 226 stored in memory of the device 201 is configured to perform the method 300 of FIG. 3.

First, at 302, a graphical user interface is displayed. The graphical user interface includes one or more interface elements for inputting instructions to add content to the content queue. The interface elements may, for example, include buttons, text boxes, hyperlinks, drop-down lists, list boxes, combo boxes, check boxes, radio buttons and/or datagrids. In at least some example embodiments, an Internet browser on the device 201 may be configured to display the graphical user interface at 302.

Figure 4:
FIG. 4 is a graphical user interface screen in accordance with example embodiments of the present disclosure.
Figure 5:
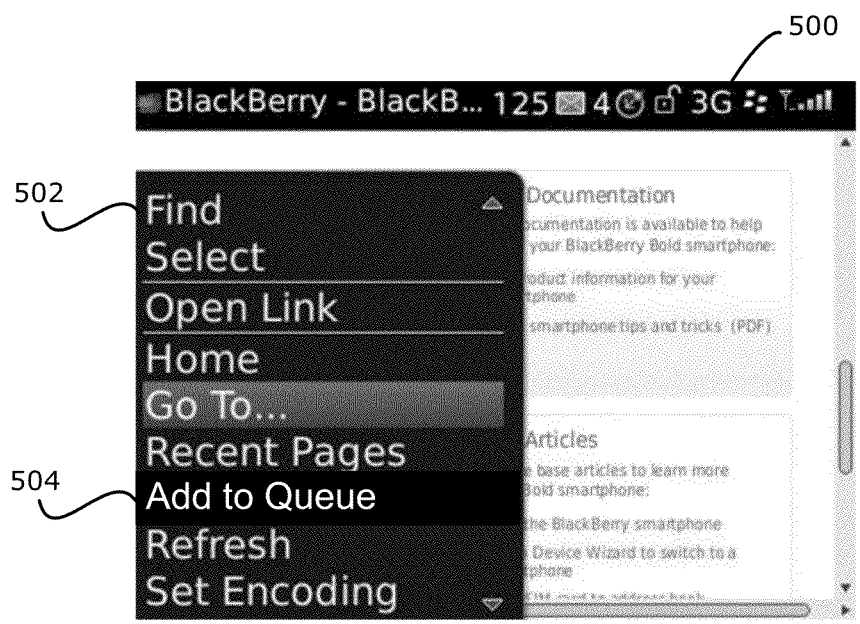
FIG. 5 is a graphical user interface screen in accordance with example embodiments of the present disclosure.

Referring for a moment to FIGS. 4 and 5, example graphical user interface screens 400, 500 are illustrated. A first graphical user interface screen 400 is illustrated in FIG. 4. The first graphical user interface screen 400 is a screen which is provided in an Internet browser operating on the device 201. The first graphical user interface screen 400 displays a web page. The first graphical user interface screen 400 includes a hyperlink 404 to digital content. In the example illustrated, the hyperlink 404 links to a document described as: "View BlackBerry Bold smartphone tips and tricks." In the example illustrated, the digital content is a document in the portable document format (PDF). However, the digital content may be of a different type, including, for example video files, audio files, documents, podcasts, e-books, web-pages, images such as photographs, icons, themes, applications, and/or games. Other types of digital content are also possible.

The first graphical user interface screen 400 also includes a cursor 402 which is movable on the graphical user interface screen 400 in response to user input via an input mechanism of the device. In at least some example embodiments, in response to the receipt of one or more predetermined user inputs via an input mechanism when the cursor is located on the hyperlink 404, an interface element for inputting an instruction to add content to the content queue may be displayed on the display.

For example, in some example embodiments, when the cursor is located on the hyperlink 404, and a predetermined input button is depressed, an interface element which permits a user to add content to the content queue is displayed.

Referring to FIG. 5, a second graphical user interface screen 500 is illustrated. The second graphical user interface screen 500 includes an interface element 504 for adding content to the content queue. In the second graphical user interface screen 500, the interface element 504 is an item in an options menu 502. The options menu 502 is displayed on the display in response to the receipt of the predetermined input when the cursor 402 is located on the hyperlink 404.

A user may interact with an input mechanism associated with the device to activate the interface element 504 and input an instruction to add content to the content queue.

Referring again to FIG. 3, when the download manager receives an instruction to add content to the content queue through the graphical user interface (as determined at 304), at 306, the download manager adds content to the content queue. That is, if an instruction to add content to the content queue is received, at 306, a location associated with that content is added to the content queue. In at least some example embodiments, the location may be a location where the content is stored. For example, the location may be a URL associated with a remote server (such as the content server 134 of FIG. 1).

In at least some example embodiments, the location may be the location of a web feed which identifies a location where the content is stored. That is, in some example embodiments, the content queue may not specify the location where all content in the content queue is stored. Rather, for at least some content in the content queue, the location may be the location of a web feed, such as an RSS feed, which lists the location where the content is stored.

As discussed previously, when the location of content is added to the content queue, further information about the content may also be added to the content queue. For example, an identifier, such as a name of the content may be added. Similarly, a file size of the content may be added to the content queue. In some example embodiments, the location of the content may be added to the content queue together with a timestamp. The timestamp may indicate the date and time when the location of the content was added to the content queue.

It will be appreciated that, in at least some example embodiments, the method 300 of FIG. 3 may be provided by a single application or module. For example, the download manager may be configured to provide for all steps of the method 300. However, in other example embodiments, the step 302 of displaying the graphical user interface with interface elements for adding content to the content queue may be provided by a separate application, such as an Internet browser on the device. When that application receives an instruction, via an input mechanism, to add content to the content queue, that application may send an instruction to an API associated with the download manager to instruct the download manager to add the content to the content queue.

As will be explained in greater detail below, after content is added to the content queue, when the device 201 is connected to a host computer 117 through the link 106, a web application operating in an Internet browser on the host computer may access the content queue in order to download the content through the host computer's 117 connection to the Internet. The content may be downloaded to the host computer, and sent through the link 106 to the device 201.

Web Application

Figure 6:
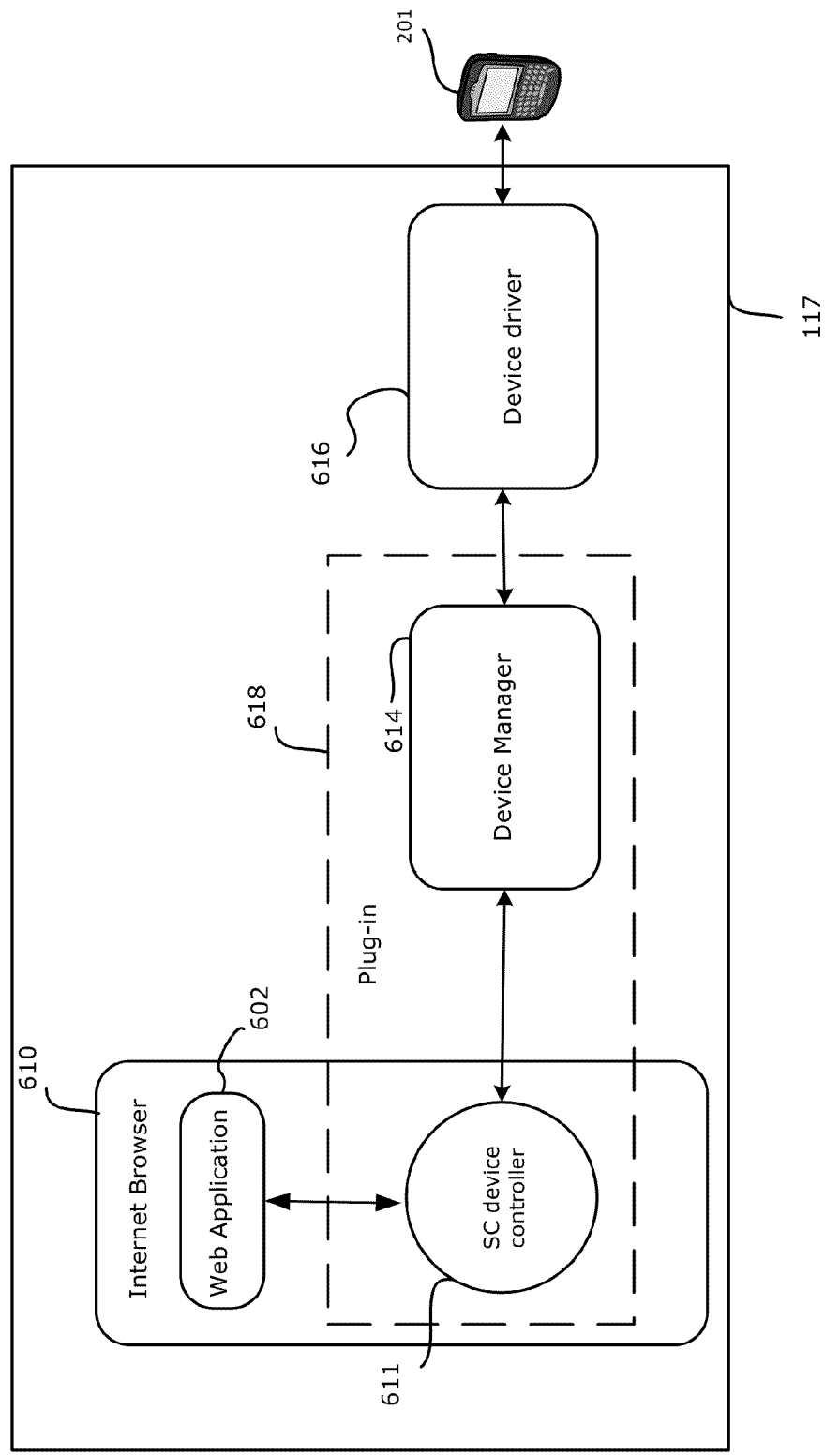
FIG. 6 is a block diagram illustrating a device communications infrastructure utilized by a web application on a computer in accordance with example embodiments of the present disclosure.

Referring now to FIG. 6 a web application 602 in accordance with one example embodiment of the present disclosure will now be described. The web application 602 is a web-based client interface which allows users to download content which has been queued for download to their mobile communication devices 201.

The web application 602 provides users with the ability to perform a controlled set of self-serve operations. Depending on the example embodiment, the web application 602 allows device users to: (i) download content in the content queue of a device 201; or (ii) remove content from a content queue of the device 201; or (iii) add content to the content queue of the device; or (iv) alter the order of the content queue. Other features and functions may be provided in addition to or instead of the features and functions listed above.

The web application 602 may be accessed from a host computer 117 having an Internet connection and any necessary communication component installed (i.e., any communication interfaces and device communication stack components).

Referring still to FIG. 6, the communications infrastructure utilized by the web application 602 to communicate with the mobile communication device 201 in accordance with one example embodiment of the present disclosure will now be described.

The web application 602 may be implemented in Dynamic HTML (Hypertext Markup Language) (DHTML) via a series of web page(s) displayed in an Internet browser 610 running on the computer 117. The DHTML of the web page(s) is provided by markup document(s) written in DHTML which are retrieved by an HTTP server or Internet server, such as the web-based content queue download interface 138 (FIG. 1) in response to a direct or indirect request from the computer 117 (e.g. by an HTTP request to access or "Go" to a respective URL or web address). The Internet browser 610 communicates with a mobile communication device 201 via a device manager 614

The device manager 614 in turn communicates with connected mobile communication devices 201 via device drivers 616. The device drivers are, in at least some example embodiments, device drivers for a USB device. A USB Device is a device that uses USB as the physical transport layer for wireline communications with the host computer 117. USB devices are connected to a USB port on the host computer 117 or a USB hub that is connected to a USB port on the host computer 117. USB device drivers are installed in the operating system of the computer 117 in order to enable wireline communications to a USB device.

It will be appreciated, however, that other device drivers are possible for communicating with devices 201 using other protocols. For example, in some example embodiments, a serial device driver may be provided for communicating with serial devices. Similarly, in other example embodiments, a Bluetooth™ device driver may be provided for communicating with Bluetooth™ enabled devices. A serial device is a device that uses RS-232 (Recommended Standard-232) serial communications as the physical transport layer for wireline communications with the computer. Serial devices are connected to a serial port on the host computer 117, for example, through a "cradle" accessory. Serial device drivers are installed in the operating system of the computer 117 in order to enable wireline communications to a serial device. Typically, serial device drivers are provided with the operating system 222 of the computer 117 and need not be installed by the web application 602.

The device manager 614 is a program or program module which manages application-level wireline access to connected mobile devices 201, and/or possibly Bluetooth™ or other short-range wireless access to connected mobile devices 201. The device manager 614 provides a service routing application programming interface (API) which provides applications such as the web application 602 with the ability to route traffic through the serial data connection (for example, USB) or Bluetooth™ connection to the computer 117 using standard connectivity protocols. The device manager 614 also provides a number of device related communication services in addition to serial or Bluetooth™ data bypass connection functionality. The communication services provided to the web application 602 by the device manager 614 include the notification of device attach and detach events, tracking of serial bypass/Bluetooth™ statistics, and device communications multiplexing.

The Internet browser 610 is equipped with a scripting engine to run client-side scripts, such as a JavaScript scripting engine for running JavaScript, within the DHTML web page(s) of the web application 602. As will be appreciated by persons skilled in the art, JavaScript is a scripting language used in client-side web document, for example, in web pages. The DHTML web pages include JavaScript code (scripts) which interact with the Document Object Model (DOM) of the DHTML web pages. The JavaScript engine of the Internet browser 610 (also known as JavaScript interpreter or JavaScript implementation) is an interpreter that interprets JavaScript scripts embedded in or included from DHTML pages and executes the scripts accordingly. The Internet browser 610 provides a runtime environment for the JavaScript engine and typically uses the public API (application programming interface) to create objects and methods through which the JavaScript scripts can interact with external processes and devices. Within the JavaScript runtime environment, objects and data may be shared between the JavaScript engine and the other components of the Internet browser 610. In other example embodiments, other scripting languages may be used such as, for example, Visual Basic for Applications (VBA), VBScript, and Visual Basic .NET all from Microsoft Corporation.

The Internet browser 610 may be Internet Explorer™ by Microsoft Corporation, FireFox™ by Mozilla Corporation, or any other Internet browser having the necessary capabilities for implementing the functions described herein. In one example embodiment, the host computer 117 runs a Windows™ operating system (by Microsoft Corporation).

As will be appreciated by persons skilled in the art, dynamic HTML is a collection of technologies used to create interactive and animated web sites by using a combination: a static markup language (such as HTML), a client-side scripting language (such as JavaScript), a presentation definition language (such as Cascading Style Sheets (CSS)), and the Document Object Model. A DHTML web page is any web page in which client-side scripting changes variables of the presentation definition language, which in turn affects the appearance and function of otherwise "static" HTML page content after the page has been fully loaded and during the viewing process. Thus, a DHTML web page is "dynamic" in that its contents and function changes while the web page is being viewed, not in its ability to generate a unique web page with each page load. This is in contrast to the broader concept of a "dynamic web page" which is any web page generated differently for each user, load occurrence, or specific variable values. This includes web pages created by client-side or server-side scripting where the content is determined prior to being viewed within the Internet browser 610. Dynamic web pages lack the ability to affect contents or function changes while a web page is being viewed.

To implement some of the functionality of the web application 602, the Internet browser 610 communicates with the connected mobile communication devices 201 and has native communication with the connected mobile communication devices 201.

The Internet browser 610 uses a Scripting-language Capable/Compatible (SC) device controller 611 to interface the JavaScript engine of the Internet browser 610 with a device communications stack (the device manager 614 and device driver 616) of the mobile communication device 201. The SC device controller 611 is a device controller which is compatible with and which provides communications services to a scripting engine of an Internet browser. In particular, the SC device controller 611 provides communications services to the JavaScript layer of the DHTML web page(s) including: notifying of device attach and detach events; sending and receiving data to connected devices. Any other communications services which require native control by the JavaScript layer of the DHTML web page(s) may be performed by the SC device controller 611. In some example embodiments, for example, embodiments in which the Internet browser 610 is Internet Explorer™, the SC device controller 611 is implemented, in whole or in part, using one or more ActiveX Controls. ActiveX controls are a Microsoft™ COM (Component Object Model)-based technology for extending the functionality of Internet browsers with third party native code extensions.

In other example embodiments, such as example embodiments in which the Internet browser 610 does not support ActiveX controls (such as, for example FireFox™), the SC device controller 611 may be implemented through a Netscape Plug-in Application Programming Interface (NPAPI) plug-in.

In either case, the SC device controller 611 (and possibly the device manager 614) may be a plug-in 618 which is used to extend the function of the Internet browser. The plug-in 618 may provide the functions of the SC device controller 611 and, in some example embodiments, the device manager 614.

The SC device controller 611 provides the DHTML web page content hosted in the Internet browser 610 with a mechanism to interact with the mobile communication devices 201 connected to the computer 117. The SC device controller 611 (e.g., ActiveX control) is instantiated within the Internet browser 610 process, which exposes COM (Component Object Model) interfaces to permit the JavaScript scripting engine of the Internet browser 610 to interact with connected devices and to perform other client side operations using native code.

Although the device drivers 616 and device manager 614 have been described as separate communication components within the device communications stack of the mobile communication device 201, it will be appreciated by persons skilled in the art that the functions implemented by these communication components may be combined within a single communication component in other example embodiments, and possibly combined with the SC device controller 611 in some example embodiments.

Web-Based Application Management

Figure 7:
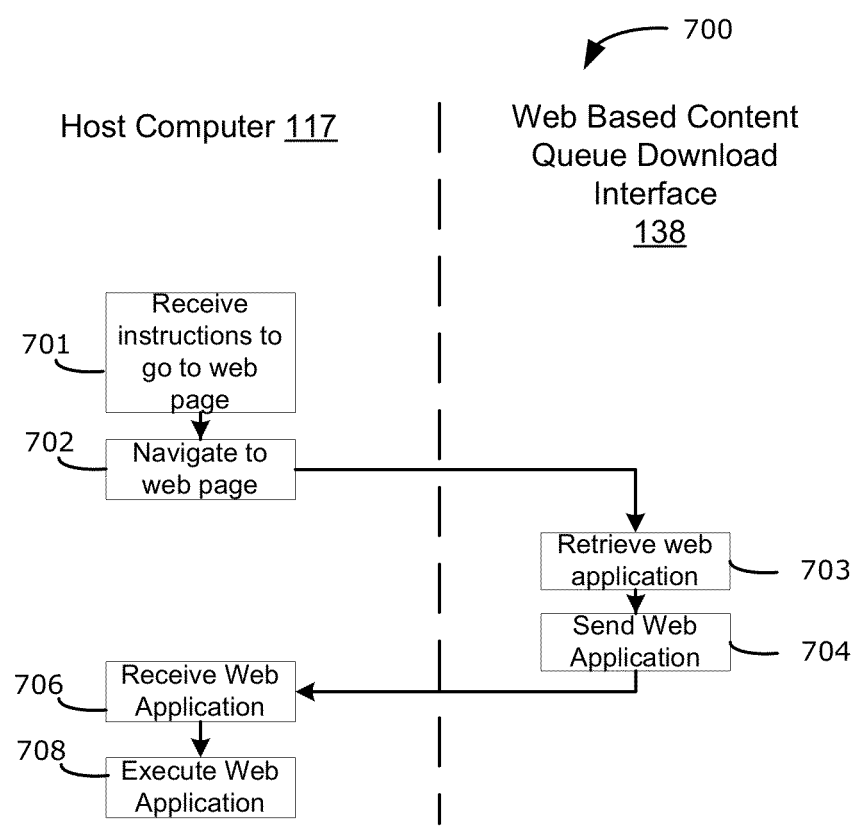
FIG. 7 is a flowchart illustrating a method for obtaining and running a web application in accordance with example embodiments of the present disclosure.

The web application 602 will be discussed in greater detail. Referring first to FIG. 7, a method 700 for obtaining and running the web application 602 (FIG. 6) is illustrated. The method 700 of FIG. 7 includes steps which may be performed by the host computer 117 (FIG. 1) and steps which may be performed by the web-based content queue download interface 138 (FIG. 1). In this example embodiment, the host-computer specific steps may be provided for by the Internet browser 610 (FIG. 6). That is, the Internet browser 610 may contain instructions for causing a processor associated with the host computer to perform the host-computer specific steps of the method 700. Similarly, the web-based content queue download interface 138 may contain instructions for causing a processor associated with the web-based content queue download interface 138 to perform the server specific steps.

First, at 701, the Internet browser 610 (FIG. 6) receives instructions to navigate to a web page. The instructions may be received, for example, by direct entry of a uniform resource locator (URL) associated with the web-based content queue download interface 138 into an address bar associated with the Internet browser. In other cases, the instructions may be received by selection of a link to a URL associated with the web-based content queue download interface 138. For example, the URL may be selected from a bookmarked link. The URL is a predetermined URL which is assigned to the web-based content queue download interface 138.

In response to receiving the instruction to navigate to the web page, the Internet browser 610 (FIG. 6), at 702 navigates to the web page. That is, the Internet browser 610 (FIG. 6) may use the URL to establish a hypertext transfer protocol (HTTP) connection or hypertext transfer protocol secure (HTTPS) connection to the web-based content queue download interface 138.

In response to the establishment of this connection, at 703, the web based application delivery server interface 138 (FIG. 1) retrieves the web application 602 (FIG. 6) from a memory storage associated with the web-based content queue download interface 138 (FIG. 1). Next, at 704, the web-based content queue download interface 138 sends the web application to the host computer 117. The web-based content queue download interface 138 is received at 706 and is executed by the Internet browser 610 at 708.

When the application is executed, it will perform one or more functions either immediately upon running or in response to the occurrence of one or more trigger conditions. The trigger conditions may be, for example, a selection, via an input mechanism associated with the host computer 117, of a selectable option to initiate one of the functions.

The web application 602 (FIG. 6) may, in various example embodiments, be configured to provide for any one or more of the following features and functions: (i) download content in the content queue of a device 201; or (ii) remove content from a content queue of the device 201; or (iii) add content to the content queue of the device; or (iv) alter the order of the content queue. These functions will be described in greater detail below.

Automatic Delivery of a Plug-in and/or Device Driver

Figure 8:
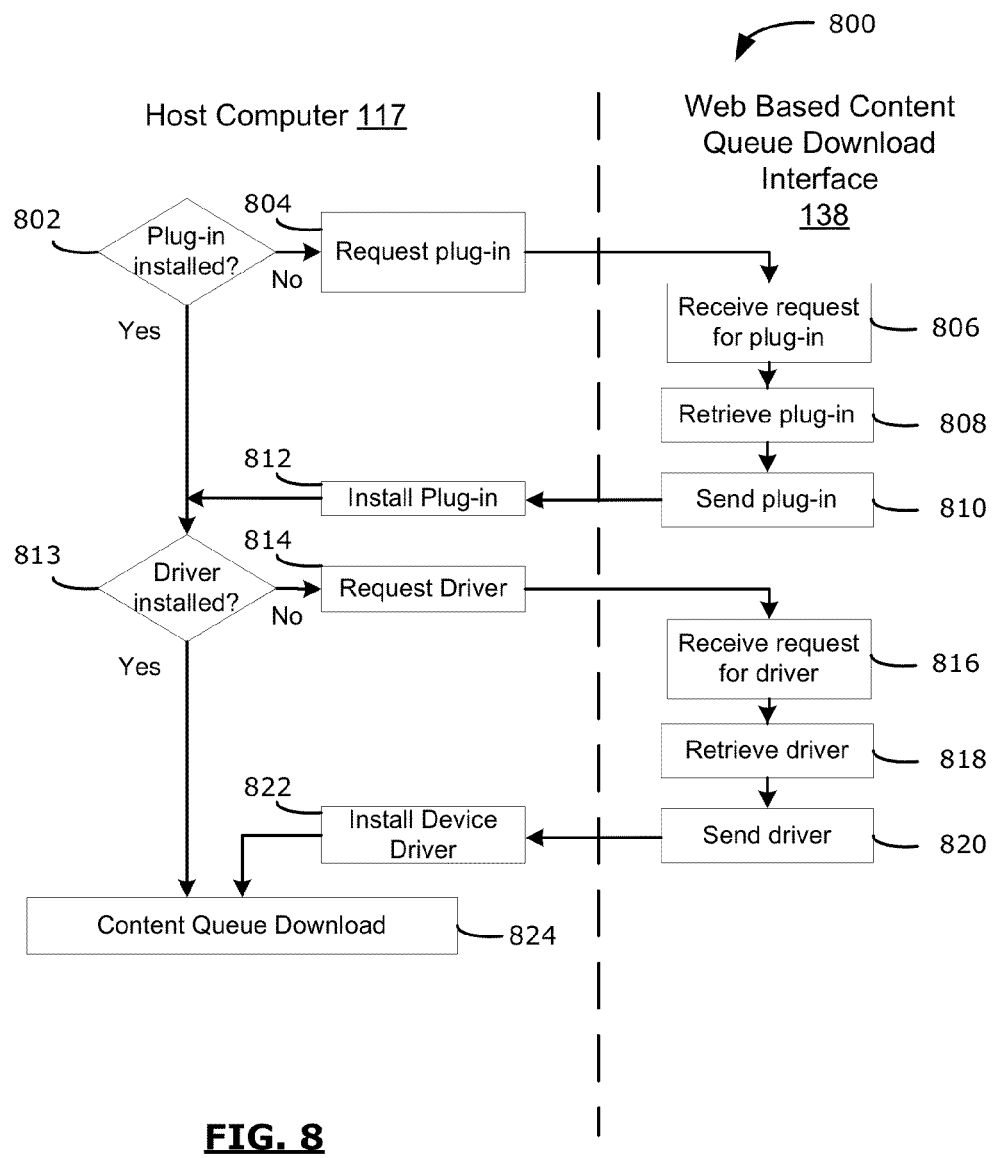
FIG. 8 is a flowchart illustrating a method for automatically delivering plug-ins and a device driver in accordance with example embodiments of the present disclosure.

Referring now to FIG. 8, in at least some example embodiments, when the web application 302 is executed (for example, at step 708 of FIG. 7), the web application 602 (FIG. 6) automatically delivers a plug-in 618 (FIG. 6) and/or a device driver 616 (FIG. 6) to the host computer 117 (FIG. 1), if the plug-in 618 and/or device driver 616 is not already installed on the host computer 117.

Accordingly, FIG. 8 illustrates a method 800 for automatically delivering a plug-in 618 (FIG. 6) and/or device driver 616 (FIG. 6). The method 800 includes steps which may be performed by the host computer 117 (FIG. 1) and steps which may be performed by a server (which may be the web-based content queue download interface 138 (FIG. 1)).

More particularly, the web application 602 (FIG. 6) may contain instructions for causing a processor (not shown) associated with the host computer 117 to perform the host-computer-specific steps. Similarly, the web-based content queue download interface 138 (FIG. 1) may contain instructions for causing a processor associated associated with the content queue download interface 138 to perform the server-specific steps.

In at least some example embodiments, the method 800 may be triggered when the web application 602 (FIG. 6) is executed. That is, the method 800 may be configured to automatically determine whether components needed to communicate with the device 201 (such as the plug-in 818 or device driver 816) are installed. In other example embodiments, the process 800 may be triggered when a user attempts to initiate a process which would require device communications. For example, the method 800 may be triggered when the user selects an option to retrieve a content queue from the device.

When the method 800 is triggered, at 802, the web application 602 determines whether the plug-in 618 is installed on the host computer 117. Next, at 804, if the host computer 117 does not already contain the plug-in, the plug-in is requested. In some example embodiments, if the host computer 117 does not include the plug-in, the web application 602 may automatically request the plug-in from a remote server, such as, for example the web-based content queue download interface 138.

In other example embodiments, if the host computer 117 does not include the plug-in, the web application 602 may display an error message within the Internet browser 610 or within a pop-up window to advise the user that the plug-in is not yet installed on the host computer 117. The error message may be presented together with a user-selectable option permitting the user of the host computer to download the plug-in by interacting with an input mechanism associated with the host computer 117. If a user selects the option to download the plug-in the request may be sent at step 804.

The request is received at the server (which may be the web-based content queue download interface 138) at 806. The server retrieves the plug-in 618 (at 808) and sends the plug-in to the host computer 117 (at 810). The host computer receives the plug-in and installs the plug-in 618 (FIG. 3) onto the host computer 117 at 812.

The installation of the plug-in onto the host computer 117 may, in some example embodiments, occur automatically. In other example embodiments, it may be user-initiated. Whether the download and installation occurs automatically or whether it requires further user-input may depend, at least in part, on the configuration of security settings on the host computer 117.

In a similar manner, in some example embodiments, the web application may be configured to determine whether the host computer 117 contains the device driver 616 which communicates with the device 201.

First, at 813, the web application 602 determines whether the device driver 616 is installed on the host computer 117. Next, at step 814, if the host computer 117 does not already contain the device driver, the device driver is requested. In some example embodiments, if the host computer 117 does not include the device driver, the web application 602 may automatically request the device driver from a remote server, such as, for example, the web-based content queue download interface 138.

In other example embodiments, if the host computer 117 does not include the device driver, the web application 602 may display an error message within the Internet browser 610 or within a pop-up window to advise the user that the device driver 616 is not yet installed on the host computer 117. The error message may be presented together with a user-selectable option permitting the user of the host computer to download the device driver by interacting with an input mechanism associated with the host computer 117. If a user selects the option to download the device driver the request may be sent at 814.

The request is received at the server (which may be the web-based content queue download interface 138) at 816. The server 138 retrieves the device driver 616 (at 818) and sends the device driver 616 to the host computer 117 (at 820).

The host computer receives the device driver 616 and installs the device driver 616 (FIG. 6) onto the host computer 117 at 822.

The installation of the device driver onto the host computer 117 may, in some example embodiments, occur automatically. In other example embodiments, it may be user-initiated. Whether the download and installation occurs automatically or whether it requires further user-input may depend, at least in part, on the configuration of security settings on the host computer 117.

In at least some example embodiments, after the plug-in and device driver are installed on the host computer 117, the method continues to 824 where the download of content from a content queue is performed. Specific methods of downloading content from a content queue will be described in greater detail below with reference to FIGS. 9 and 11.

Download of Content in Content Queue

In at least some example embodiments, the web application 302 may be configured to retrieve a content queue from the device 201 (FIG. 1) over a link 106 (FIG. 1) and to retrieve content identified in the content queue from one or more content servers 134 (FIG. 1) and to send such content, through the link 106, to the device 201.

Figure 9:
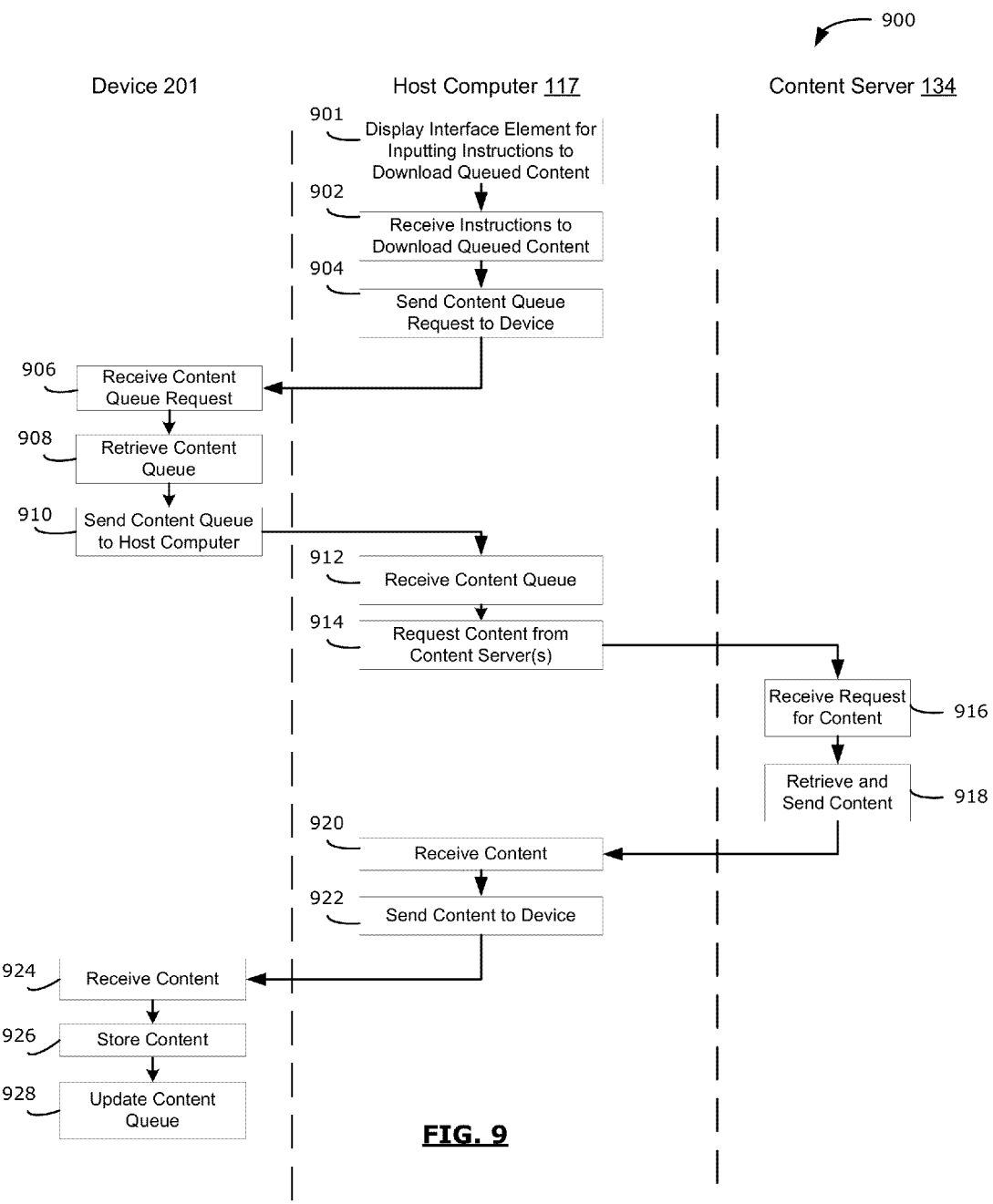
FIG. 9 is a flowchart illustrating a method for transmitting content to a device in accordance with example embodiments of the present disclosure.

Referring now to FIG. 9, a method 900 of transmitting content to a device is illustrated in flowchart form. The method 900 may be performed in response to the occurrence of a trigger condition. For example, in at least some embodiments, the method 900 is performed when the web application 602 (FIG. 6) is executed. For example, the method 900 may be included in the step 708 of FIG. 7. In some example embodiments, the method 900 may be performed after the host computer 117 (FIG. 1) is configured to communicate with the device 201 through the Internet browser. For example, the method 900 may be included in the step 824 of FIG. 8.

The method 900 includes steps which may be performed by the host computer 117 (FIG. 1), steps which may be performed by a content server 134 (FIG. 1)), and steps which may be performed by the device 201 (FIG. 1).

More particularly, the web application 602 (FIG. 6) may contain instructions for causing a processor (not shown) associated with the host computer 117 to perform the host-computer-specific steps. Similarly, the web-based content queue download interface 138 (FIG. 1) may contain instructions for causing a processor associated with either of these servers to perform the server-specific steps. The download manager (FIG. 2) may contain instructions for causing the processor 240 (FIG. 2) associated with the device 201 to perform the device-specific steps.

First, at 901, in some example embodiments, the web application 602 (FIG. 6) displays one or more selectable interface elements within the Internet browser for inputting instructions to download queued content. The interface element may include, for example, a suitably-labeled command button, a hyperlink, etc. A user may interact with the interface element using an input mechanism associated with the host computer. For example, a navigational input mechanism such as a mouse, or a touchscreen display may be used to select the interface element. The interface elements are displayed on in a graphical user interface on a display associated with the host computer.

The instruction to download queued content is received by the web application 602 (FIG. 6) at 902.

It will be appreciated that, in some example embodiments, 901 and/or 902 may be omitted. Instead, the method of retrieving the content queue and retrieving the content identified in the content queue may be performed without a specific instruction being received. Instead, the act of navigating to the URL associated with the web application 602 may be interpreted as a request to download queued content and the remaining steps of the method 900 may be performed. That is, when a user uses the Internet browser to navigate to the web application, the download of queued content may automatically be performed, without the need for further user input.

Next, at step 904, the web application 602 sends a content queue request to the device 201 through the link 106. The content queue request is a message which requests that the device 201 return a content queue 231 (FIG. 2). The content queue 231 is a list of digital content which is to be downloaded to the device 201. The digital content may include, for example, video files, audio files, documents, podcasts, e-books, web-pages, images such as photographs, icons, themes, applications, and/or games. Other types of digital content are also possible.

The content queue includes a location associated with the content. For example, the location may identify the location on a remote server where the content is stored. The location may be a uniform resource locator (URL), which specifies the location where the content is available. That is, the content queue may identify a location of content stored on a remote content server 134 (FIG. 1). The content queue may, in at least some example embodiments, specify a location of the content server 134 and, in some example embodiments, a path and/or filename of the content. The location of the content server 134 may be specified in terms of a domain name or an IP address.

In some example embodiments, the location may be the location of a web feed which identifies the location of the content. For example, the location may be the location of an RSS feed, an XML feed, and/or a podcast. In at least some example embodiments, the web feed contains a location of digital content which is included in the web feed. For example, where the web feed is a podcast, the web feed may identify locations at which the audio or video files in the podcast are stored. Thus, while the specific location where the content is stored may not be included in the content queue, the location of the content may be determined by consulting the web feed located at the location specified in the content queue.

In at least some example embodiments, the content queue may also include information about previously downloaded content. For example, where the content queue includes a location of a web feed, the content queue may also include information regarding the last download of content from that web feed. By way of example, the content queue may specify any one or more of: a list of all content downloaded from the web feed; an identification of the last content downloaded from the web feed; a date and/or time when a download from the web feed was last attempted. In at least some example embodiments, the information regarding the last download of content may be specified in terms of a publication date and time of the last content downloaded from the web feed. For example, where the web feed is a podcast, the information may specify the publication date and time of the last audio file downloaded from that podcast to the device 201.

The information regarding the last download of content reduces may be used by a web application 602 (FIG. 6) to reduce the likelihood that the same content is repeatedly downloaded to the device 201.

The content queue request is received at the download manager of the device 201 at 906. In response to receiving the content queue request, the download manager retrieves the content queue (at 908) from memory of the device 201 and sends (at 910) the content queue to the web application 602 on the host computer 117 (FIG. 1) through the link 106.

Next, at 912, in response to sending the content queue request, the content queue is received at the host computer 117. The web application 302 then retrieves the content in accordance with the locations in the content queue.

In some example embodiments, where the content queue identifies the location at which content is stored, at 914, the web application 602 sends a request to the content server 134 located at that location. That is, the web application 602 requests that the content server 134 provide the content located at the location specified in the content queue. The request may, in at least some example embodiments, be in the form of an HTTP request.

In other example embodiments (not shown), where the content queue identifies the location of a web feed which identifies locations at which content is stored, at 914, the web application may first request the web feed from the location in the content queue. The web application 602 receives the web feed. The web feed identifies the location at which the content is stored. The web feed may, for example, specify one or more URL associated with the web feed. The web application 602 may then identify locations of content from the web feed and retrieve the content from the locations identified from the web feed.

In some example embodiments, where the content queue identifies the location of a web feed which identifies the locations at which content is stored, the content at each of the locations in the web feed may be downloaded. For example, where the web feed is a podcast, all audio or video files in the podcast may be retrieved.

In other example embodiments, only specific content may be selected from the web feed for download. For example, previously downloaded content may not be selected for download. To prevent redundant downloading of content, the content queue may also include information about previously downloaded content.

The information regarding previously downloaded content in the web feed may be used at step 914 to determine which content in the web feed is new; that is, to determine which content has not been previously downloaded. In such example embodiments, only content in the web feed which is determined to be new (i.e. not previously downloaded) will be downloaded. For example, where the content queue identifies a location of a podcast, the content queue may also identify the last audio or video file downloaded in the podcast. This may be specified, for example, by the publication date of the last audio file downloaded in the podcast. In such example embodiments, only the new audio files in the podcast may be retrieved. Audio files in the podcast which were previously downloaded are not retrieved. That is, in at least some example embodiments, the only content in the podcast which is retrieved is content which was published subsequent to the last content downloaded from that podcast.

The request for content is received at each content server 134 at 916 and the content servers 134 retrieve the requested content and send the content to the host computer 177 (at 918).

The content is received at the host computer 117 at 920. The web application 602 on the host computer 117 then automatically sends the content to the device 201 through the link 106 (at 922). That is, the content is sent to the device 201 in response to the content being received at the host computer without any further input from a user via an input mechanism.

While the steps of requesting content and receiving content 920 have been illustrated in FIG. 9 as occurring only once, in practice, these steps may be repeated many times. These steps may, for example, be repeated for each location of content specified in the content queue and/or a web feed. Furthermore, while only one content server 134 is depicted in FIG. 9, content may be retrieved from more than one content server.

In some example embodiments, the content which is requested from the content server 134 (FIG. 1) at 914 may no longer be available on the content server 134. In such cases, the host computer 117 may send an error message to the device 201 through the link 106 (FIG. 1) to indicate that the content is no longer available.

After content is received at the host computer 117 (at 920) and sent to the device 201 (at 922), the content is received at the download manager on the device 201 (at 924). The download manager then stores the content on the device 201 (at 926).

In at least some example embodiments, at some time after the receipt of content at 920 or the request for content at 914, the content queue may be updated (at 928). For example, where the content queue specifies the location at which the content is stored, that location may be removed from the content queue for any downloaded content.

In example embodiments where the content queue specifies a web feed which identifies locations of content, the content queue may be updated to include information about the content which was requested (at 914) and/or received (at 920). For example, where the content queue includes a location of a web feed, the content queue may be updated to include a list of all content which was requested (step 914) and/or received (at 920) for each web feed in the content queue. In some example embodiments, the content queue may be updated to include a list of the content in the web feed which was most recently requested or received for each web feed in the content queue. In some example embodiments, the content queue may be updated to include a publication date and time of the last content downloaded from each web feed in the content queue.

As noted above with respect to 914, the information about the content may be used to ensure that content in a web feed is not subsequently re-downloaded.

In the example embodiment of FIG. 9, the content queue is updated on the device 201. However, in other example embodiments, the content queue may be updated elsewhere. For example, in some example embodiments, the web application 602 on the host computer 117 updates the content queue and sends the updated content queue to the device 201 over the link 106 (FIG. 1) for storage.

Figure 10:
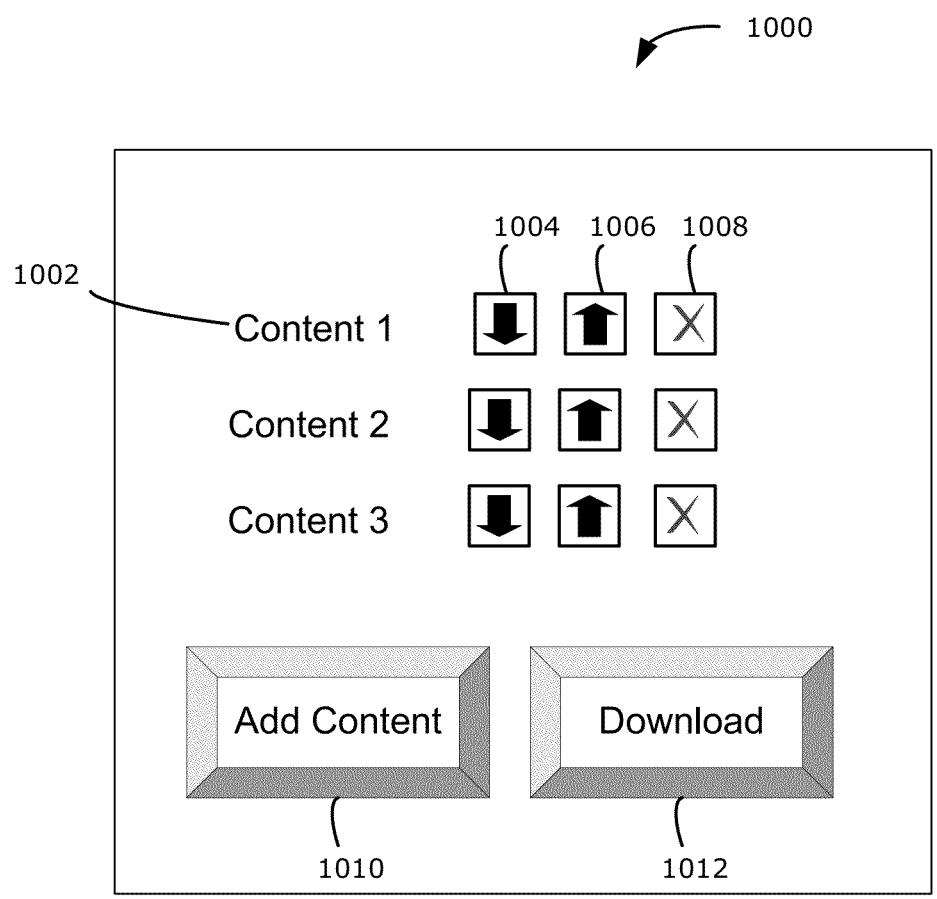
FIG. 10 is a content queue management screen in accordance with example embodiments of the present disclosure.

Referring now to FIG. 10, in at least some example embodiments, the web application 602 (FIG. 6) may provide a graphical user interface for managing the content queue. The graphical user interface may include one or more content queue management screens 1000, an example of which is illustrated in FIG. 10. The content queue management screen 1000 includes one or more interface elements 1004, 1006, 1008, 1010, 1012 which may be used for inputting instructions to the web-application 602 (FIG. 6) via an input mechanism (not shown) associated with the host computer 117. The input mechanism may, for example, be a navigational input device, such as a mouse or a touchscreen.

The interface elements of the content queue management screen 1000 may, in various example embodiments, include buttons, text boxes, hyperlinks, drop-down lists, list boxes, combo boxes, check boxes, radio buttons and/or datagrids, which allow a user to input commands and instructions to the web application.

In at least some example embodiments, the content queue management screen 1000 includes a list of content identifiers 1002 identifying at least some of the content in the content queue. The content identifiers 1002, in at least some example embodiments, identify the location associated with the content in the content queue. In some example embodiments, the content queue may be too large to permit displaying the complete contents of the content queue on a single page. In such example embodiments, the contents of the content queue may be split so that only a portion of the content queue is displayed at any given time.

In some example embodiments, the content queue management screen 1000 includes one or more interface elements 1004, 1006 for altering the order of content in the content queue. For example, in the example embodiment t of FIG. 10, the content queue management screen 1000 displays the list of content in the content queue together with user interface elements 1004, 1006 which permit a user to increase or decrease the position of content in the content queue relative to the position of other content in the content queue. In the example embodiment of FIG. 10, the interface element 1004 is used to increase the position of content while the interface element 1006 is used to decrease the position of content. A user of the device 201 may interact with the interface elements using an input mechanism associated with the computer 117 to input an instruction to alter the order of content in the content queue.

In at least some example embodiments, the content queue management screen 1000 includes one or more interface elements 1008 for removing content from the content queue. The interface elements 1008 may permit a user to select any of the content to be removed from the content queue. For example, a user may interact with the interface element 1008 using an input mechanism associated with the host computer to input an instruction to remove content from the content queue.

In some example embodiments, the content queue management screen 1000 includes one or more interface elements 1010 for adding content to the content queue. In the example embodiment illustrated, the interface elements is a command button labeled "Add Content." In at least some example embodiments, a selection of the interface element 1010 will result in a further screen being displayed which allows a user to identify the location associated with the content to be added to the content queue. A user may interact with the interface element 1010 using an input mechanism associated with the host computer to input an instruction to add content to the content queue.

In some example embodiments, the content queue management screen 1000 includes an interface element 1012 for initiating the download of content in the content queue. A user may interact with the interface element using an input mechanism associated with the host computer to input an instruction to download content associated with the content queue.

Figure 11:
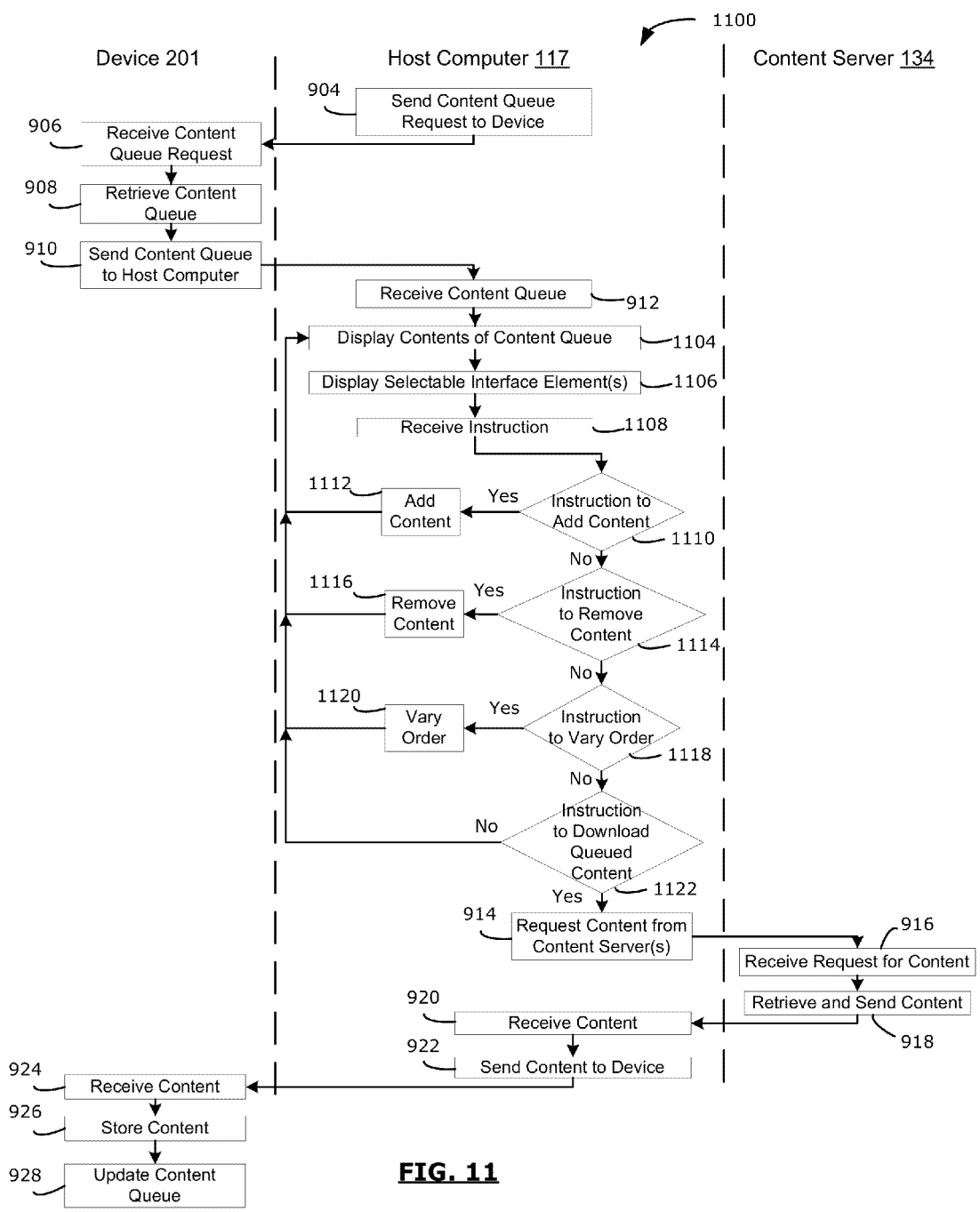
FIG. 11 is a flowchart illustrating a method for transmitting content to a device in accordance with example embodiments of the present disclosure.

Referring now to FIG. 11, a further method 1100 of transmitting content to a device 201 is illustrated. The method 1100 is similar to the method 900 of FIG. 9. However, the method 1100 provides for further content queue management features which are not discussed with reference to FIG. 9. Furthermore, in the method 1100 illustrated in FIG. 11, the downloading of content is initiated in response to receiving an instruction at the host computer 117 to download of content.

The method 1100 may be performed in response to the occurrence of a trigger condition. For example, in at least some example embodiments, the method 1100 is performed when the web application is executed. For example, the method 1100 may be included in the step 708 of FIG. 7. In some example embodiments, the method 900 may be performed after the host computer is configured to communicate with the device 201 through the Internet browser. For example, the method 1100 may be included in the step 824 of FIG. 8.

The method 1100 include steps which may be performed by the host computer 117 (FIG. 1), steps which may be performed by a content server 134 (FIG. 1)), and steps which may be performed by the device 201 (FIG. 1).

More particularly, the web application 602 (FIG. 6) may contain instructions for causing a processor (not shown) associated with the host computer 117 to perform the host-computer-specific steps. Similarly, the web-based content queue download interface 138 (FIG. 1) may contain instructions for causing a processor associated with either of these servers to perform the server-specific steps. The download manager (FIG. 2) may contain instructions for causing the processor 240 (FIG. 2) associated with the device 201 to perform the device-specific steps.

First, at 904, the web application 602 sends a content queue request to the device 201 through the link 106. This step is discussed in greater detail above with reference to FIG. 9.

The content queue request is received at the download manager of the device 201 at 906. In response to receiving the content queue request, the download manager retrieves the content queue (at 908) from memory of the device 201 and sends (at 910) the content queue to the web application 602 on the host computer 117 (FIG. 1) through the link 106.

Next, at 912, in response to sending the content queue request, the content queue is received at the host computer 117.

In at least some example embodiments, at 1104, the web application 602 displays the contents of the content queue on a display associated with the host computer. The web application 602 may also display one or more selectable interface elements on the display associated with the host computer 117 (at 1106). The interface elements may each be associated with one or more of the following instructions: an instruction to add content to the content queue; an instruction to remove content from the content queue; an instruction to vary the order of the content queue; and/or an instruction to download content associated with the content queue.

The steps 1104 and 1106 of displaying the content of the content queue and displaying selectable interface elements for inputting instructions to the web application may, in at least some example embodiments, be performed by displaying a content queue management screen 1000 similar to the content queue management screen 1000 illustrated in FIG. 10.

Next, at step 1108, instructions are received at the web application through an input mechanism associated with the host computer 117. That is, the instructions may be received when the input mechanism is used to engage an interface element displayed in the screen 1000 (FIG. 10).

If the instruction is an instruction to add content (as determined at 1110), then at 1112, the web application adds the content to the queue. That is, a location associated with the content may be added to the content queue. The location may, for example, be a location of a remote server (such as a content server 134) where the content is stored. In some example embodiments, the location may be a location of a web feed which identifies the locations of content included in that web feed.

If the instruction is an instruction to remove specified content (as determined at 1114), then at 1116, web application 602 removes the specified content from the content queue.

If the instruction is an instruction to vary the order of content in the content queue (as determined at 1118), then at 1120, the web application 602 (FIG. 6) varies the order of the content queue. The order of the content queue may, in at least some example embodiments, determine the order that content associated with the content queue will be downloaded. Content which is ranked higher in the content queue will be downloaded before content which is ranked relatively lower in the content queue.

In at least some example embodiments (not shown), where the order or contents of the content queue are varied, the updated content queue may be sent to the device 201 over the link 106.

If the instruction is an instruction to download queued content, as determined at step 1122, then the web application may download the content in the content queue in the manner described in greater detail above with reference to FIG. 9. More particularly, the steps 914, 916, 918, 920, 922, 924, 926 and 928 discussed above with reference to FIG. 9 may be performed in order to retrieve the content associated with the content queue from one or more content servers 134 and send the retrieved content to the device 201 where it is stored.

In will be appreciated that, in some example embodiments, many of the features described above with respect to the web application 602 may, instead, be provided by the plug-in 618 or by another software component or module on the host computer 117.

Furthermore, in some example embodiments, the web-application 602 may be supported by a back-end server, such as, for example, the web based content queue download interface (FIG. 1). In such example embodiments, one or more of the functions described above with reference to the host computer 117 may be performed on the back-end server. That is, the web-application running on the host computer 117 may communicate with the back-end server, where at least some of the processing is performed.

In accordance with further example embodiments of the present disclosure, there is provided apparatus such as a data processing system (e.g. computer and/or server) for implementing the methods described herein, a computer program product including a computer readable medium having stored thereon computer program instructions for implementing the methods described herein on a suitable data processing system, as well as a computer data signal having program instructions recorded therein for practising the methods of the present disclosure on a suitable data processing system.

In accordance with further example embodiments of the present disclosure, there are provided a computer program product including a computer readable medium having stored thereon computer executable instructions including instructions for practising the methods of the present disclosure.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

FIGS. 3, 7 to 9 and 11 are flowcharts illustrating example embodiment methods (also referred to herein as processes). Some of the steps illustrated in the flowcharts may be performed in an order other than that which is described. Also, it should be appreciated that not all of the steps described in the flow charts are required to be performed, that additional steps may be added, and that some of the illustrated steps may be substituted with other steps.

The example embodiments of the present disclosure described above are intended to be examples only. Those of skill in the art may effect alterations, modifications and variations to the particular embodiments without departing from the intended scope of the present disclosure. In particular, features from one or more of the above-described example embodiments may be selected to create alternate example embodiments included of a sub-combination of features which may not be explicitly described above. In addition, features from one or more of the above-described example embodiments may be selected and combined to create alternate example embodiments included of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

The invention claimed is:

1. A method for transmitting content to a mobile communication device connected to a host computer, the method comprising:
    sending a content queue request to the mobile communication device from a web application running within a web browser on the host computer;
    in response to sending the content queue request, receiving at the host computer a content queue from the mobile communication device, the content queue identifying one or more locations of remote servers associated with content;
    retrieving content, by the web application, in accordance with the one or more locations identified in the content queue; and
    sending the content from the host computer to the mobile communication device.

2. The method of claim 1, further comprising, prior to sending the content queue request to the mobile communication device:
    displaying, in the web browser on the host computer, a selectable interface element for inputting instructions to download content queued on the mobile communication device.

3. The method of claim 2, wherein the content queue request is sent in response to the receipt of an instruction through the web browser to download content queued on the mobile communication device.

4. The method of claim 1, wherein at least one of the locations identifies the location of a podcast.

5. The method of claim 4, wherein the content queue further identifies a last audio file downloaded in the podcast, and wherein retrieving the content comprises:
    retrieving any new audio files in the podcast.

6. The method of claim 5, wherein retrieving any new audio files in the podcast comprises:
    retrieving any audio files in the podcast published subsequent to the last audio file downloaded in the podcast.

7. The method of claim 5, wherein the last audio file downloaded in the podcast is identified in the content queue by a publication date of the last audio file downloaded in the podcast.

8. The method of claim 1, wherein at least one of the one or more locations is a location of a really simple syndication feed.

9. The method of claim 1, wherein the location is identified using one or more uniform resource locators.

10. The method of claim 1, wherein the mobile communication device is a USB enabled mobile communication device which is connected to the host computer via a universal serial bus connection.

11. The method of claim 1, further comprising:
if the content is not available from the one or more remote servers, sending an error message to the mobile communication device.

12. A server comprising:
a memory storing a web application configured to:
send a content queue request from the web application running within a web browser on a host computer to a mobile communication device connected to the host computer;
in response to sending the content queue request, receive at the host computer a content queue from the mobile communication device, the content queue identifying one or more locations of remote servers associated with content;
retrieve content in accordance with the one or more locations identified in the content queue; and
send the content from the host computer to the mobile communication device.

13. The server of claim 12, wherein the web application is further configured to, prior to sending the content queue request to the mobile communication device:
display, in the web browser on the host computer, a selectable interface element for inputting instructions to download content queued on the mobile communication device.

14. The server of claim 12, wherein the content queue request is sent in response to the receipt of an instruction through the web browser to download content queued on the mobile communication device.

15. The server of claim 12, wherein at least one of the locations identifies the location of a podcast.

16. The server of claim 12, wherein the content queue further identifies a last audio file downloaded in a podcast, and wherein retrieving the content comprises:
retrieving any new audio files in the podcast.

17. The server of claim 16, wherein retrieving any new audio files in the podcast comprises:
retrieving any audio files in the podcast published subsequent to the last audio file downloaded in the podcast.

18. The server of claim 16, wherein the last audio file downloaded in the podcast is identified in the content queue by a publication date of the last audio file downloaded in the podcast.

19. The server of claim 12, wherein at least one of the one or more locations is a location of a really simple syndication feed.

20. A method for transmitting content to a mobile communication device connected to a host computer, the method comprising:
receiving instructions through a web browser on the host computer to download queued content; and
in response to receiving instructions to download queued content:
sending a request to the mobile communication device, from the web browser, to obtain a content queue from the mobile communication device, the content queue identifying content which is stored on one or more remote servers;
receiving the content queue at the host computer;
retrieving, by the host computer, the content listed in the content queue from the one or more remote servers; and
transmitting the content from the host computer to the mobile communication device.

\* \* \* \* \*